United States Patent [19]

Ito

[11] Patent Number: 4,770,532
[45] Date of Patent: Sep. 13, 1988

[54] EQUIPMENT FOR OPTICALLY MEASURING THE HEIGHT OF STEP

[75] Inventor: Yoshitoshi Ito, Ome, Japan

[73] Assignee: Hitachi, Ltd., Tokyo, Japan

[21] Appl. No.: 17,610

[22] Filed: Feb. 24, 1987

[30] Foreign Application Priority Data

Mar. 13, 1986 [JP] Japan .................................. 61-53755

[51] Int. Cl.$^4$ ............................................ G01B 11/00
[52] U.S. Cl. .................................... 356/372; 356/376
[58] Field of Search .............................. 356/376, 372; 250/201 AF

[56] References Cited

U.S. PATENT DOCUMENTS 4,595,271 6/1986 Suda et al. .................... 250/201 AF

FOREIGN PATENT DOCUMENTS 0070141 1/1983 PCT Int'l Appl. ................. 356/372
2116724 9/1983 United Kingdom ................. 356/372

*Primary Examiner*—R. A. Rosenberger
*Assistant Examiner*—Crystal Cooper
*Attorney, Agent, or Firm*—Antonelli, Terry & Wands

[57] ABSTRACT

An equipment for optically measuring the height of step according to the present invention is characterized in that a linearly polarized laser beam from a laser source is guided onto the side of an object through an optical fiber transferring said beam in the state that the plane of polarization thereof is maintained, the beam emitted from the optical fiber is applied onto the spots in proximity to each other on the surface of the object through the intermediary of an optical system separating said beam into two component beams having planes of polarization perpendicular to each other, the beams reflected from the surface of the object are made to go back through the aforesaid optical system so that two optical paths overlap each other, and are passed in the reverse direction through the aforesaid optical fiber and guided onto the side of the laser source, the optical power of the component parallel to the plane of polarization of the incident beam and the component perpendicular thereto out of the reflected beams emitted from the optical fiber are detected by photo detectors respectively, and the height of step in the object is determined from the ratio between these optical powers.

10 Claims, 3 Drawing Sheets

EQUIPMENT FOR OPTICALLY MEASURING THE HEIGHT OF STEP

BACKGROUND OF THE INVENTION

The present invention relates to an equipment for optically measuring a height of a step, and particularly to an equipment for measuring a height of a step using an optical fiber suitable for noncontact measurement of a minute amount of the height of the step, and it is applied, for instance, to the measurement of the height of the step formed on a semiconductor wafer when semiconductor devices are manufactured.

One of prior-art methods for noncontact measurement of a minute height of a step is discussed in the Applied Optics, Vol. 20 (1981), pp. 610 to 618. The method discussed therein utilizes beat signals of laser beams oscillated at different frequencies. By utilizing the Zeeman effect, a helium-neon (He-Ne) laser can be made to oscillate simultaneously laser beams slightly different in wavelength from each other. These laser beams different in wavelength have planes of polarization perpendicular to each other.

The laser beams are focused on the surface of an object by an optical system whose sectional structure is illustrated in FIG. 4. A Wollaston prism 41 employed as a component in the optical system of FIG. 4 refracts incident beams having planes of polarization perpendicular to each other, in the different directions respectively. Because of this refraction, the laser beams are focused at two positions on the surface of an object 43 by an objective lens 42, and the focused positions are separated according to the planes of polarization of the laser beams. The light reflected by the surface of the object is transmitted again through the focusing objective lens 42, and optical paths having been separated are made to coincide again by the operation of the Wollaston prism 41. The incident light in the Wollaston prism 41 contains laser beams different in frequency, and therefore, when a light having some component plane of polarization is taken out by a polarizer, the laser beam having the component plane of polarization generates a beat of a frequency which is equal to the difference in frequency between the laser beams.

The beams having the component planes of polarization perpendicular to each other advance along separate optical paths, which coincide again by the Wollaston prism 41 which previously separated the paths. When these two optical paths are equal in length, the phase of the beat generated from the reflected light is equivalent to that of the beat of the laser beams incident in the Wollaston prism 41. In the case when the optical paths are different in length in the course from separation to coincidence thereof, however, a change occurs in the phase of the beat. This change in the phase of the beat is caused by the difference in length between the optical paths, and this difference, in its turn, results from the unevenness of the surface of an object. Therefore, the change in the phase is measured, and the unevenness of the surface of the object is calculated from values obtained from the measurement.

One example of a method of measuring a minute change in the height by using an optical fiber is shown in the Applied Physics Letter, Vol. 41 (1982), pp. 231 to 233. According to this method, laser beams separated in two by a directional coupler are projected onto the surface of a sample with a time difference between them, and beams reflected therefrom are coupled again by the directional coupler so that they interfere with each other. The change in the height of the surface of the sample appearing within the time difference in application of the beams onto the sample is measured from a change in the intensity of the laser beam caused by the interference.

Out of the above-described prior arts, the former requires the fixation on an optical base of the components constituting an optical system so as to prevent the mutual spacing of the components from being varied by vibrations. This results in enlarged dimensions of equipment, an increased weight thereof, causing a problem in employment thereof. Moreover, this is a method utilizing a Zeeman effect, and therefore it requires the so-called Zeeman laser oscillated in two frequencies, which produces a problem that an expensive equipment is needed.

The latter of said prior arts can not be applied to the measurement of the difference in height of the surface of an object, since it can measure only an amount changing with time, although it has succeeded in making equipment small in size and light in weight by the use of the optical fiber.

SUMMARY OF THE INVENTION

The present invention is aimed to furnish an equipment for optically measuring the height of a step which is capable of measuring a minute difference in height of the surface of an object and which is small in size and light in weight.

The present invention solves the above-described problems by a construction wherein a linearly polarized laser beam is guided onto the side of an object through an optical fiber which transfers the beam in the state that its plane of polarization is maintained, the beam coming out of the optical fiber is passed through an optical system whereby it is split into two component beams whose planes of polarization are perpendicular to each other, the beams thus split are projected on the spots located in proximity to each other on the surface of the object, the beams reflected from the surface of the object are made to go back through the optical system so that two optical paths overlap each other, the beams are then guided in the reverse direction through the optical fiber onto the laser source side, the optical power of the component parallel to the plane of polarization of the incident beam out of the reflected beams passed through the optical fiber, and the optical power of the other component of said beams perpendicular to the former are detected by a photodetector respectively, and the height of a step in the object is determined from the ratio between these optical powers.

DESCRIPTION OF THE PREFERRED EMBODIMENTS

Figure 1:
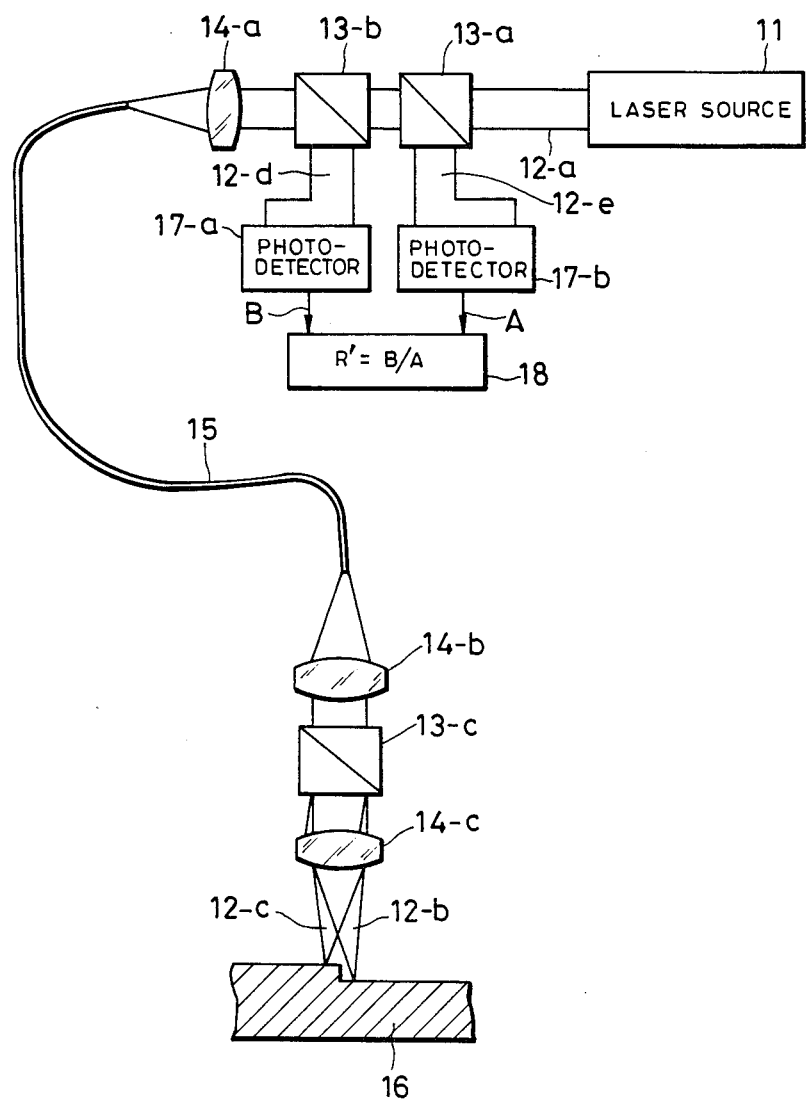
FIG. 1 is an illustration of the construction of an equipment which is one embodiment of the present invention.

First a description will be made on the principle of the present invention.

A laser beam from a laser source is guided onto the side of an object by using an optical fiber (hereinafter called a polarization-maintaining fiber) which transfers a light in the state that the plane of polarization thereof is maintained, and it is focused on the surface of the object through a Wollaston prism and a lens.

The laser source and the polarization-maintaining fiber are so connected to each other that a linearly polarized laser beam is emitted from the end of the polarization-maintaining fiber on the object side when the beam is guided onto the object side by the fiber. The linearly polarized laser beam guided by the fiber is separated into two components having the planes of polarization perpendicular to each other by utilizing the operation of the Wollaston prism, and then the component beams are focused on different spots on the surface of the object by a lens.

The laser beams reflected on the surface of the object go back along optical paths, and the separated optical paths are made to join again by the Wollaston prism. In this way, the laser beams separated in two by the Wollaston prism run along the different optical paths respectively in accordance with the polarization component thereof, and are made to overlap each other again by the Wollaston prism. When the two optical paths are equal in length, the beams made to overlap by the Wollaston prism become a linearly polarized beam having the same plane of polarization with that of the laser beam incident in the Wollaston prism. When the lengths of the two optical paths are different from each other because of the unevenness of the surface of the object, on the other hand, the overlapping laser beams become an elliptically polarized light, and therefore a component having the plane of polarization perpendicular to the plane of polarization of the incident laser beam is produced.

When the difference between the optical paths is denoted by 2d, the phase difference $\Delta$ of the light is represented by $$\Delta = \frac{2\pi}{\lambda}(2d) \qquad (1)$$

where $\lambda$ denotes the wavelength of the light.

When the elliptically polarized light produced by the overlapping is divided into a component A having a plane of polarization parallel to the plane of polarization of the incident light and a component B having a plane of polarization perpendicular thereto, the optical power of each component is expressed as follows.

optical power of component A $\alpha \cos^2\Delta$ ... (2)

optical power of component B $\alpha \sin^2\Delta$ ... (3)

The beams of these two polarization components are transferred onto the laser source side by the polarization-maintaining fiber respectively. Then, the polarization component beams are separated from each other, and the optical power of each beam is measured. The power ratio R (=B/A) is expressed as follows.

$$R = \sin^2\Delta/\cos^2\Delta = \tan^2\Delta \ldots \qquad (4)$$

If the value of $\Delta$ is small, the equation (4) can be approximated to $$R = \Delta^2 = \left(\frac{2\pi}{\lambda} \cdot 2d\right)^2. \qquad (5)$$

Accordingly, the optical path difference 2d can be calculated from the optical power ratio R by using the equation (5). $\frac{1}{2}$ of the optical path difference 2d is a difference d in height between two spots whereon the beams are focused on the surface of the object.

Next, an embodiment of the present invention will be described with reference to drawings.

Embodiment 1

FIG. 1 is an illustration of an optical system of the present embodiment. In FIG. 1, numeral 11 denotes a laser source (e.g., a gas laser) emitting a linearly polarized laser beam 12-a. 13-a denotes a beam splitter having the function of a half mirror. This splitter maintains the plane of polarization of the incident linearly-polarized laser beam and transmits a part thereof, while reflecting the remaining part thereof. 13-b denotes a polarizing beam splitter having a function of transmitting the component parallel to the plane of polarization of the incident linearly-polarized laser beam while reflecting the component perpendicular thereto. 14-a denotes a lens focusing the laser beam 12-a on the source-side end of a polarization-maintaining fiber 15. 14-b denotes a lens whereby the laser beam emitted from the object side end of the polarization-maintaining fiber 15 is converted into a parallel flux of light. 13-c denotes a Wollaston prism, which is attached with the axis of crystal fixed so that the linearly polarized laser beam converted into the parallel flux of light by the lens 14-b to be separated into two components having planes of polarization perpendicular to each other and that the advancing directions of beams be shifted to be different from each other. A lens 14-c focuses the laser beam transmitted through the Wollaston prism 13-c on the surface of the object 16.

After being transmitted through the beam splitter 13-a and the polarizing beam splitter 13-b, the linearly polarized laser beam 12-a emitted from the laser source 11 is focused on the source-side end of the polarization-maintaining fiber 15 by the lens 14-a.

Figure 2:
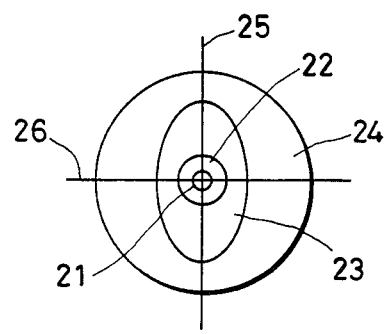
FIG. 2 is an illustration of the sectional structure of a polarization-maintaining fiber used in the present invention.

FIG. 2 shows one example of the structure of the end of the polarization-maintaining fiber 15. Numeral 21 denotes a core, 22 a clad, 23 an elliptical clad, and 24 a jacket. 25 denotes the long axis of the elliptical clad and 26 the short axis thereof. In the polarization-maintaining fiber shown in FIG. 2, a light whose plane of polarization is parallel to the direction of the long axis of the elliptical clad or to the direction of the short axis thereof is transferred in the state that the plane of polarization thereof is maintained.

In the embodiment of FIG. 1, the polarization-maintaining fiber 15 is so adjusted that the direction of the long axis of the elliptical clad, for instance, is parallel to the plane of polarization of the linearly polarized laser beam 12-a focused by the lens 14-a. The laser beam thus transferred is emitted as a linearly polarized laser beam from the object-side end of the polarization-maintaining fiber 15.

Figure 3:
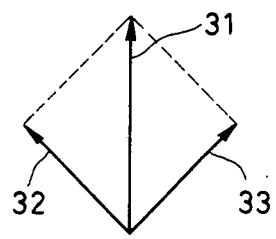
FIG. 3 is an illustration of the relationship between the plane of polarization of a linearly polarized beam and the planes of polarization of split component beams.
Figure 4:
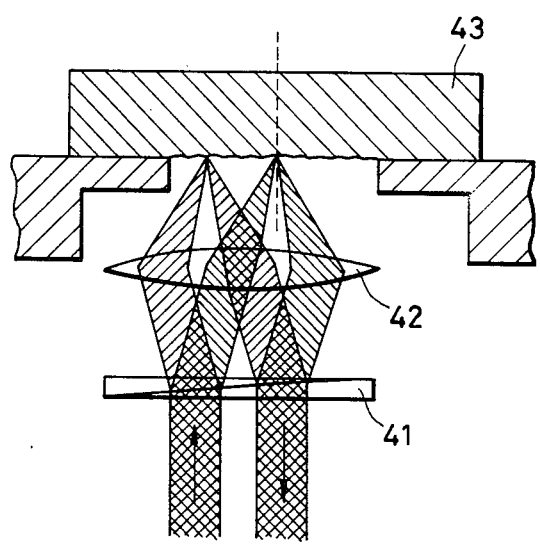
FIG. 4 is an illustration of the separation and overlapping of beams by a Wollaston prism.

A linearly polarized light can be resolved into two polarization components whose planes of polarization are different by $\pm\pi/4$ from the polarizing plane of the original light and perpendicular to each other. Fig. 3 shows the relationship between the linearly polarized light and the resolved polarization components perpendicular to each other. Numeral 31 denotes the linearly polarized light, while 32 and 33 denote component lights which are perpendicular to each other and of which the directions of planes of polarization are different by $\pm\pi/4$ from that of the linearly polarized light 31.

The linearly polarized laser beam emitted from the object-side end of the polarization-maintaining fiber 15 is separated into the polarization components perpendicular to each other by the Wollaston prism 13-c, and the advancing directions of the components are shifted so that they advance in the different directions according to the planes of polarization thereof. 12-b and 12-c denote the linearly polarized laser beams advancing in the respective directions.

The lens 14-c focuses on the surface of the object 16 the laser beams whose advancing directions are shifted by the Wollaston prism 13-c. The beams are focused on different positions corresponding to the advancing directions thereof.

The beams reflected on the surface of the object go back along incident optical paths and pass through the Wollaston prism 13-c, whereby the two optical paths are joined together, and they advance further in the reverse direction through the polarization-maintaining fiber 15 onto the laser source side. The laser beam out of those advancing onto the laser source side which has a plane of polarization perpendicular to the plane of polarization of the incident light is split off by the polarizing beam splitter 13-b and turns to be a linearly polarized laser beam 12-d. The reflected laser beam having a plane of polarization parallel to that of the incident light, on the other hand, is transmitted through the polarizing beam splitter 13-b and enters the beam splitter 13-a, and a part of it is separated to be a linearly polarized laser beam 12-e.

The optical powers of the laser beam 12-d perpendicular to the plane of polarization of the incident light and of the laser beam 12-e parallel thereto, out of the reflected beams, are measured as B and A by photo detectors 17-a and 17-b respectively. Then, the ratio $R'=B/A$ between the optical powers thus measured is determined by a divider 18, and the optical power ratio R between the reflected beams having the planes of polarization perpendicular to each other is calculated from a value of the product of R' and a constant determined by the transmittance of the beam splitters 13-a and 13-b. The height of a step, d, on the surface of the object is determined from the value of this optical power ratio R by using the equation (5) as described previously.

Embodiment 2

In the present embodiment, a semiconductor laser is employed as the laser source 11 in the construction shown in FIG. 1. Since the laser beam emitted from the semiconductor laser has a large angle of divergence, it is necessary, in this case, to combine the semiconductor laser with a lens for converting the beam into a parallel flux of light. This combination is employed as the laser source 11 of FIG. 1. Other components of equipment than the above and an operation mechanism are the same with those of Embodiment 1.

Embodiment 3

Equipment for measuring the height of a step for many spots on an object, for displaying the size of the difference in height corresponding to the measured spot and for imaging the shape of the object is provided in the present embodiment.

Figure 5:
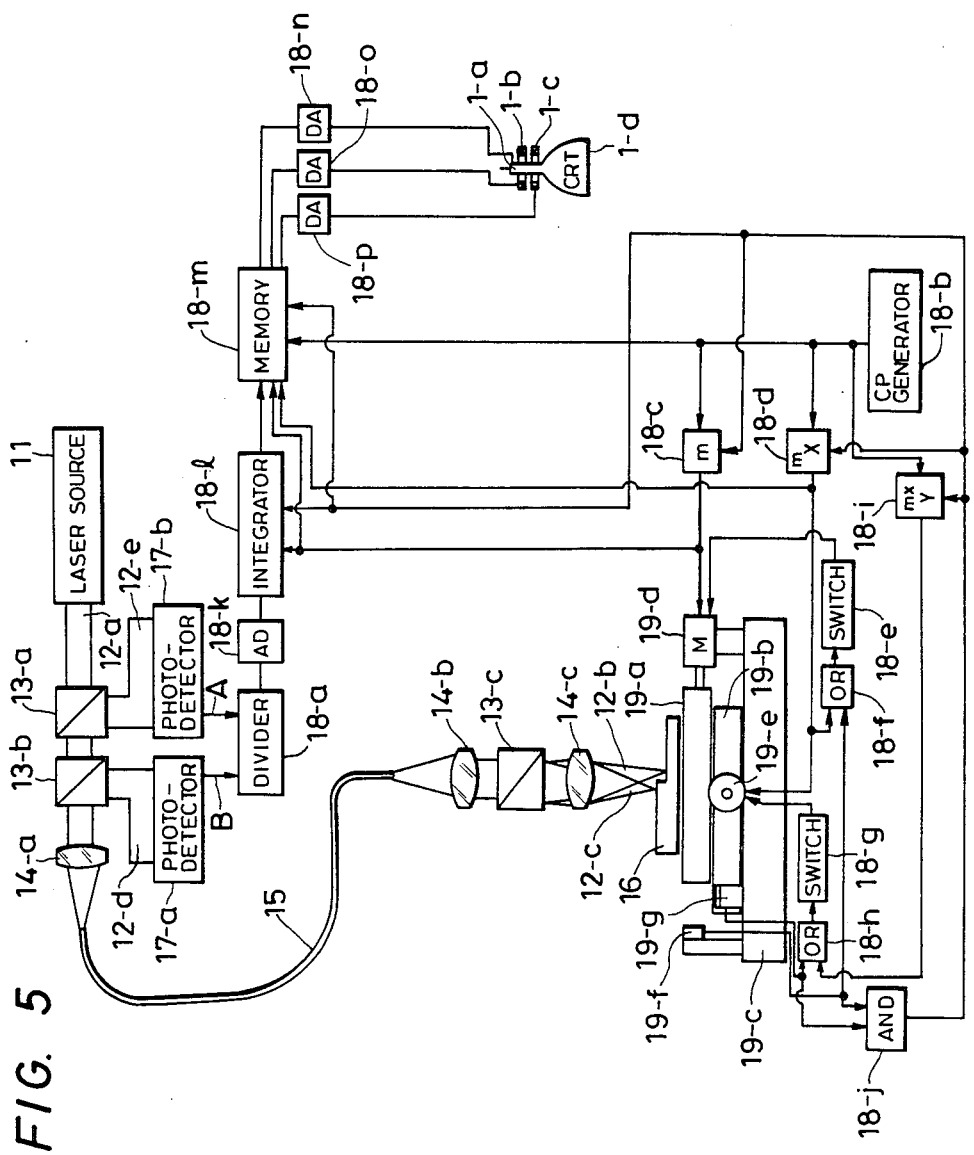
FIG. 5 is an illustration of the construction of an equipment which is another embodiment of the present invention.

FIG. 5 is an illustration of the construction of the equipment of the present embodiment. In FIG. 5, the components denoted by reference numerals 11 to 18-a are the same that are described in Embodiment 1. The present embodiment is constructed by adding, to the equipment of FIG. 1, a mechanical sample scanning system comprising components 19-a to 19-e, a control system comprising components 18-b to 18-i, a signal operation system comprising components 18-j to 18-o and 1-a to 1-d, and a display.

First, a description will be made of the mechanical sample scanning system and the control system. Reference numeral 19-a denotes a slide stage moving in the direction of an X-axis, and this stage is mounted on a slide stage 19-b sliding in the direction of a Y-axis. The slide stage 19-b is mounted, in its turn, on a fixed stage 19-c. The slide stages 19-a and 19-b are driven by pulse motors 19-d and 19-e respectively. When the slide stages 19-a and 19-b reach the maximum movement positions respectively, a near sensor 19-f in the direction of the X-axis and a near sensor 19-g in the direction of the Y-axis operate to generate signals respectively.

The pulse motors 19-d and 19-e are driven on the basis of pulse signals sent from a clock pulse generator 18-b of the control system. 18-c denotes a pulse generating circuit which functions as a frequency divider generating one pulse every time when clock pulses numbering m are inputted thereto, and the pulse motor 19-d for the drive in the X-axis direction is driven by an output pulse from this circuit. The amount of movement of the slide stage 19-a by one pulse is so set as to be equal to an interval between the spots of light of the linearly polarized laser beams 12-b and 12-c on the object 16.

18-d denotes a pulse generating circuit for operating the pulse motor 19-e for the drive in the Y-axis direction, and it serves as a frequency divider of clock pulses. 18-e denotes a switching circuit for inverting the direction of a current flowing through an exciting coil of the pulse motor 19-d. This switching circuit 18-e is operated to invert the direction of a magnetic field for excitation so as to reverse the direction of rotation of the pulse motor 19-d.

18-f denotes a pulse generating circuit for generating a pulse to operate the switching circuit 18-e, and it is an OR circuit which receives as input an ON-OFF signal outputted from the X-axis near sensor 19-f and an output signal of the pulse generating circuit 18-d.

18-g denotes a switching circuit for switching the direction of an exciting current of the pulse motor 19-e for the drive in the Y-axis direction. 18-h denotes a pulse generating circuit generating a pulse for operating the switching circuit 18-g, and it is an OR circuit which receives as input signals an ON-OFF signal outputted from the Y-axis near sensor 19-g and an output signal of a pulse generating circuit 18-i.

The pulse generating circuit 18-i serves as a frequency divider of clock pulses. When it is assumed that measuring points used for imaging the height of a step are x in number in the X-axis direction and y in the Y-axis direction, totaling x·y on a two-dimensional plane, the pulse generating circuit 18-*i* generates one pulse for every m·x·y clock pulses.

The pulse generating circuits 18-*c*, 18-*d* and 18-*i* serve as frequency dividers respectively, and they count clock pulses and generate output pulses when the count of the clock pulses reaches a set number. In order to be synchronous with the movement of the slide stages 19-*a* and 19-*b*, these frequency dividers need to be so designed as to start a count with the same clock pulse used as a reference. For this purpose, an output pulse of a pulse generating circuit 18-*j* is delivered to each frequency divider as a pulse for starting the count. The pulse generating circuit 18-*j* is an AND circuit receiving as input the ON-OFF signals outputted from the X-axis near sensor 19-*f* and the Y-axis near sensor 19-*g*.

Next, a description will be made on the display. Reference numeral 18-*k* denotes an AD converter which converts an output of the divider 18-*a* into a digital signal. By 18-*l* is denoted an integrator which integrates an output of the AD converter 18-*k*. To this integrator an output pulse of the pulse generating circuit 18-*j* is sent as a signal to set the circuit in the initial state, while an output pulse of the pulse generating circuit 18-*c* is sent to said integrator as a pulse for making it execute an integrating operation for every one step of the X-axis slide stage 19-*a*.

By 18-*m* is denoted a memory circuit which receives as input signals an output signal of the integrator 18-*l* which is a step height signal, and output signals of the pulse generating circuits 18-*c* and 18-*d*, which serve as address signals of the measuring spots. To this memory circuit 18-*m* as well, the output pulse of the pulse generating circuit 18-*j* is sent as an initializing signal, and further the output pulse of the pulse generating circuit 18-*c* is also sent thereto as a signal for making it execute reading for every one step of the slide stage 19-*a* in the X-axis direction.

By 18-*n* is denoted a DA converter which converts a height difference signal read out of the memory circuit 18-*m* into an analog voltage signal and delivers the output thereof to a brightness modulation terminal 1-*a* of a cathode-ray tube 1-*d* to modulate the brightness of this tube. By 18-*o* and 18-*p* are denoted DA converters which convert into analog current signals the address signals of the height difference measuring spots read out of the memory circuit 18-*m* and send the outputs thereof to the deflecting coils 1-*b* and 1-*c* for the X-axis and Y axis of the cathode-ray tube 1-*d* respectively to deflect electron beams so that beam spot positions on the cathode-ray tube correspond to the step height measuring spots.

Next, a description will be made on the operation of the equipment of the present embodiment. First, with the generation of clock pulses by the clock pulse generator 18-*b*, the pulse generating circuit 18-*c* and 18-*d* are made to operate to generate pulses for driving the pulse motors 19-*d* and 19-*e* respectively. With the rotation of the pulse motors, the slide stages 19-*a* and 19-*b* are moved, and thereby the X-axis near sensor 19-*f* and the Y-axis near sensor 19-*g* are operated. Based on signal pulses delivered from these two near sensors, the pulse generating circuit 18-*j* generates one pulse. This pulse is sent to the pulse generating circuits 18-*c*, 18-*d* and 18-*i*, the integrator 18-*l* and the memory circuit 18-*m*, and each circuit is initialized by this pulse.

Simultaneously, the pulse generating circuit 18-*f* and the switching circuit 18-*e*, as well as the pulse generating circuit 18-*h* and the switching circuit 18-*g* are operated to reverse the rotating directions of the pulse motors 19-*d* and 19-*e*, whereby the slide stages 19-*a* and 19-*b* are moved in the directions reverse to those taken theretofore.

The slide stage is moved by one step in the X-axis direction with every m clock pulses, and the height of step is measured at each step. The step height signal which is the output of the divider 18-*a* is converted into a digital signal by the AD converter 18-*k* and integrated by the integrator 18-*l*. The step height signal signifies a difference in height from an adjacent spot, and therefore, when the height of step at each measuring point is added up, the output of the integrator 18-*l* at each step indicates the height at each measuring point on the basis of the spot measured when an initializing pulse is generated.

At each one step of movement of the slide stage 19-*a*, accordingly, the height at the then measuring point is written in the memory circuit 18-*m*, and simultaneously the signal on the measuring spot is also written therein. When clock pulses are generated by m·x in number, the slide stage 19-*a* is moved by x steps. Then the pulse generating circuit 18-*d* generates one pulse. By this pulse the pulse generating circuit 18-*f* and the switching circuit 18-*e* are made to operate to reverse the direction of rotation of the pulse motor 19-*d*. By every subsequent m clock pulses, therefore, the slide stage 19-*a* moves in the direction reverse to that taken theretofore.

Meanwhile, the output of the pulse generating circuit 18-*d* makes the pulse motor 19-*e* operate by one step simultaneously, and thereby the slide stage 19-*b* is moved in the Y-axis direction. Then, with the movement of the slide stage in the X-axis direction subsequent to the above movement, the measurement of the height of the step at a subsequent measuring point is conducted. The operation for measuring the step height at each step is the same as at the above-stated step.

When clock pulses reach the number of m·x·y counted from the generation of the initializing pulse, the pulse generating circuit 18-*i* operates to generate one pulse. This pulse makes the pulse generating circuit 18-*h* and the switching circuit 18-*g* operate to reverse the direction of rotation of the pulse motor 19-*e*. Thus, the measurement of the height of the step at each point is continued one by one.

The height signal and the address signal for each point stored in the memory circuit 18-*m* are converted into analog ones by the DA converters 18-*n*, 18-*o* and 18-*p*, and moreover the height of the step is represented by the brightness proportional to the height at each point on the cathode-ray tube 1-*d*, on the basis of the aforesaid signals, whereby the step height structure of the object is displayed two-dimensionally.

According to the present invention, the construction wherein the optical fiber is used provides the equipment with flexibility, making unnecessary an optical base requisite in prior-art equipment, making the equipment small in size and light in weight, and improving the operability thereof. As to the result of measurement, it is not affected at all by a fluctuation in the output of a laser source, if any, since the result is obtained as the ratio between a reflected light having a plane of polarization parallel to the plane of polarization of an incident light and a reflected light perpendicular thereto. Accordingly, the present invention enables the employment of an inexpensive laser source and thus it is excellent also from an economical point of view.

In addition, the present invention has an advantage that a minute height of step can be measured even for a sample whose surface has a small reflectance, in contrast with the measurement of the difference in height for which multiple interference is utilized.

What is claimed is:

1. An equipment for optically measuring the height of a step, comprising: a laser source for generating a linearly polarized laser beam having a plane of polarization; a light transfer means for transferring said linearly polarized laser beam from one end to another end and for maintaining the plane of polarization of said beam; an optical system including means for separating the laser beam emitted from the another end of said light transfer means into two optical paths formed of component beams having planes of polarization perpendicular to each other and for making said component beams fall on spots in proximity of each other on a surfce of an object, and for making the beams reflected from said object go back so that they overlap each other in one optical path and to focus the reflected beams thus overlapping on the another end of the light transfer means; a light detecting means for detecting an optical power of a component parallel to the plane of polarization of the linearly polarized laser beam and an optical power of a component perpendicular thereto, from the reflected beams emitted from the one end of the light transfer means and for providing outputs indicative thereof; and means for determining the height of a step on the surface of the object from a ratio between the outputs from said light detecting means indicative of the optical powers respectively.

2. An equipment for optically measuring the height of a step according to claim 1, the aforesaid light transfer means is a polarization-maintaining fiber.

3. An equipment for optically measuring the height of a step according to claim 1, wherein the laser source includes a semiconductor laser.

4. An equipment for optically measuring the height of step according to claim 1, wherein the optical system includes a Wollaston prism.

5. An equipment for optically measuring the height of a step according to claim 1, wherein the light detecting means includes a beam splitter, a polarizing beam splitter and photo detectors connected to the beam splitter and polarizing beam splitter respectively.

6. Equipment for optically measuring the height of a step, comprising:
laser source means for generating a linearly polarized laser beam;
light transfer means for transferring the laser beam from one end to another end thereof without varying a plane of polarization of the laser beam;
an optical system including means for separating the laser beam emitted from the another end of the light transfer means into two optical paths formed of component beams having planes of polarization perpendicular to each other and for making the component beams fall on spots in proximity to each other on a surface of an object, and for receiving an overlapping the beams reflected from the object in one optical path and focusing the reflected beams on the another end of the light trasfer means;
light detecting means responsive to the reflected beams emitted from the one end of the light transfer means for detecting an optical power of a component parallel to the plane of polarization of the linearly polarized laser beam and an optical power of a component perpendicular thereto and for providing outputs indicative of the respective detected optical powers; and
means for determining the height of a step on the surface of the object from a ratio between the outputs from the light detecting means indicative of the respective optical powers.

7. Equipment according to claim 6, wherein the light transfer means comprises a polarization-maintaining fiber.

8. Equipment according to claim 6, wherein the laser source means comprises a semiconductor laser.

9. Equipment according to claim 6, wherein the optical system includes a Wollaston prism.

10. Equipment according to claim 6, wherein the light detecting means comprises a first beam splitter, a second polarizing beam splitter, and first and second photodetectors connected respectively to the first and second beam splitters.

* * * * *